(12) United States Patent
Andreason

(10) Patent No.: US 6,937,703 B1
(45) Date of Patent: *Aug. 30, 2005

(54) CONNECTION OF A COMPUTER TO A TELEPHONE EXCHANGE

(75) Inventor: Per Tomas Andreason, Tyresö (SE)

(73) Assignee: Telefonaktiebolaget LM Ericsson, Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1520 days.

(21) Appl. No.: 08/828,548

(22) Filed: Mar. 31, 1997

(51) Int. Cl.[7] .......................... H04M 1/64; H04M 3/00; H04M 7/00

(52) U.S. Cl. .................. 379/88.17; 379/69; 379/70; 379/88.07; 379/379; 379/88.18; 379/220.01; 379/221.02; 379/225; 379/231; 379/265.09

(58) Field of Search ................... 370/352, 353, 370/380, 389, 392, 396, 401, 404, 427, 435, 450, 465, 485, 400; 379/90.01, 93.01, 93.05, 93.09, 100.15, 100.16, 88.17, 88.18, 265.01, 265.09

(56) References Cited

U.S. PATENT DOCUMENTS

| | | | | |
|---|---|---|---|---|
| 4,771,425 A | * | 9/1988 | Baran et al. | 370/85 |
| 5,327,486 A | * | 7/1994 | Wolff et al. | 379/96 |
| 5,526,353 A | * | 6/1996 | Henley et al. | 370/60.1 |
| 5,604,737 A | * | 2/1997 | Iwami et al. | 370/352 |
| 5,608,446 A | * | 3/1997 | Carr et al. | 348/6 |
| 5,608,786 A | * | 3/1997 | Gordon | 379/100 |
| 5,726,984 A | * | 3/1998 | Kubler et al. | 370/349 |
| 5,742,905 A | * | 4/1998 | Pepe et al. | 455/461 |
| 5,751,706 A | * | 5/1998 | Land et al. | 370/352 |
| 5,768,513 A | * | 6/1998 | Kuthyar et al. | 395/200.34 |
| 5,790,548 A | * | 8/1998 | Sistanizadeh et al. | 370/401 |
| 5,805,587 A | * | 9/1998 | Norris et al. | 370/352 |
| 5,884,262 A | * | 3/1999 | Wise et al. | 704/270 |
| 5,923,659 A | * | 7/1999 | Curry et al. | 370/401 |
| 5,940,598 A | * | 8/1999 | Strauss et al. | 395/200.79 |
| 6,014,379 A | * | 1/2000 | White et al. | 370/389 |
| 6,069,890 A | * | 5/2000 | White et al. | 370/352 |

FOREIGN PATENT DOCUMENTS

| | | |
|---|---|---|
| EP | 0 696 124 A2 | 2/1996 |
| JP | 07 307789 A | 11/1995 |

(Continued)

OTHER PUBLICATIONS

"The Internet Telephony Red Herring", Colin Low, XP 002043901, Hewlett Packard, May 15, 1996.

(Continued)

*Primary Examiner*—Allan Hoosain (57) ABSTRACT

The present invention relates to a telephone system, an exchange and a method for setting up telephone connections between a computer, which is an extension of the exchange, and the exchange via a computer network. The exchange comprises a switch core, a switch control means for setting up connections and a network connection device connected between the switch core and the computer network. The computer comprises a function for use as a telephone and has a computer network address. The network connection device registers the computer as a telephone to which calls can be made in the switch control means, sets up at least one traffic channel via the computer network for sending speech signals, and, receives data packets containing telephony from the computer over the traffic channel and removes a signal structure suitable for telephony from the data packets. The switch control means allocates a telephone number to the computer.

21 Claims, 5 Drawing Sheets

FOREIGN PATENT DOCUMENTS

| | | |
|---|---|---|
| JP | 08 111692 A | 4/1996 |
| SE | 9602212-4 | 6/1996 |
| SE | 9602918-6 | 8/1996 |
| SE | 9604409-4 | 11/1996 |
| SE | 9700152-3 | 1/1997 |
| WO | WO 96/20553 | 7/1996 |
| WO | WO 96/38018 | 11/1996 |
| WO | WO/9731491 | 8/1997 |

OTHER PUBLICATIONS

S. Saunders, "PBXs and Data: The Second Time Around", 8178 Data Communications, vol. 22, No. 9, pp. 69–74, Jun. 1993.

S. Diehl, "Data's New Voice", BYTE, vol. 21, No. 9, pp. 129–135, Sep. 1996.

H. Kaufman, "An Introduction to Distributed Multi-Media Networks", Netspeak Corporation.

"Line Transmission of Non–Telephone Signals, Visuals Telephone Systems and Equipment for Local Area Networks Which Provide a Non–Guaranteed Quality of Service", Draft ITU–T Recommendation H.323, May 28, 1996.

* cited by examiner

CONNECTION OF A COMPUTER TO A TELEPHONE EXCHANGE

TECHNICAL FIELD

The present invention relates to the connection of a computer to a telephone exchange and more particularly to a private branch exchange having a computer connected as an extension for telephone purposes.

STATE OF THE ART

Computer networks in the form of internet and intranets are in widespread use and the possibility of transmitting voice over computer networks such as the internet has become more and more popular because of the low price on using the internet. Many companies also have intranets or local computer networks for communication between computers in the company.

Many computers today are also equipped with loudspeakers, microphones and software for using the computer as a telephone. Such types of software include Webphone and Cooltalk.

WO96/20553 is mainly concerned with a system of transmitting voice mail and electronic mail messages in a computer network. It does also describe setting up of telephone calls via the internet. It is however not concerned with setting up telephone calls to a computer.

In a Brochure "An introduction to distributed multimedia networks", by Harvey Kaufman, Netspeak Corporation, a telecommunication system is shown including telephone exchanges in the form of private branch exchanges (PBX) which are interconnected both by a public switched telephone network (PSTN) and by computer networks to computers. They are connected to the computer via gateways. This document describes the setting up of a telephone call from a computer to an ACD center (Automatic Call Distribution) that might be incorporated into an exchange. The computer is here probably connected to this exchange via a modem and the public switched telephone network PSTN, and not directly to the exchange via a computer network.

The telecommunications standard ITU-T H.323 describes different protocols for conversion of speech to data packets in a gateway and vice versa for use in communication between computers and telephone equipment.

The Swedish patent application No. SE 9602918-6, filed 2 Aug. 1996, which is identical to U.S. provisional application "Method and Arrangement for Connection Between a Computer Network and a Telecommunication Network", filed Aug. 12, 1996, describes how two private branch exchanges can use the internet for setting up compressed voice calls between them, each using a modem connected to the backplane or switch core of the PBX.

Swedish patent application No. SE 9602212-4, filed 4 Jun. 1996, discloses an exchange in a telecommunication network to which a computer is connected via a modem. Calls made to the telephone number associated with the modem are re-routed to a telephone server, for compression, packing into packets and contacting of the computer via internet. The connection between the exchange and the computer is a telephone connection. In this case telephone signals are packed into data packets that are then sent on a normal telephone line.

Swedish patent application No. SE 9604409-4 filed 29 Nov. 1996 discloses a modem which multiplexes telephone signals and data packets on a telephone line so that a user having his computer connected to the PSTN can talk on the telephone while at the same time using the computer via this sole telephone connection.

Swedish patent application No. SE 9700152-3, filed 21 Jan. 1997 describes a computer that controls a cordless telephone connected to an exchange.

SUMMARY OF THE INVENTION

Multimedia PCs (personal computers) of today have the necessary hardware to handle voice. A lot of software is becoming available, which provides telephone functionality to those PCs. Many companies have multimedia PCs on the desks, but they cannot be directly connected to a PBX (Private Branch Exchange), and the PBX features and resources are not available to the PCs.

Thus the present invention concerns a problem of how to connect a computer to an exchange for use as a telephone extension, when both the exchange and the computer are connected to a computer network and the computer comprises a telephone function.

This is solved by registering, in the exchange, the computer as a telephone to which calls can be made and allocating a telephone number to the computer, by setting up, between a network connection device of the exchange and the computer via the computer network, at least one traffic channel for receiving speech signals. The network connection device receives data packets containing telephony from the computer over said traffic channel and removes a signal structure suitable for telephony over the computer network from the content of the data packets. The object of the invention is thus to obtain an exchange, a telephone system comprising such an exchange and a method for connecting a computer to the exchange as an extension for use as a telephone, when both the exchange and the computer are connected to a computer network and the computer comprises a telephone function.

This object is achieved by an exchange and a telephone system, where the exchange comprises a switch core, a switch control means responsible for setting up connections between users of the exchange and at least one first network connection device connected between the switch core and the computer network. The computer comprises a telephone function and has a computer network address. One network connection device in the exchange registers the computer as a telephone to which calls can be made in the switch control means and sets up, via the computer network, at least one traffic channel between the exchange and the computer for sending speech signals. The network connection device applies a signal structure suitable for telephony over the computer network to speech signals received from the switch core in order to produce data packets containing telephony, which speech signals are intended for the computer. The network connection device sends the data packets containing telephony to the computer over the traffic channel. The switch control means allocates a telephone number to the computer.

This object is also achieved by a method having the steps of registering, in the exchange, the computer as a telephone to which calls can be made and allocating a telephone number to the computer, setting up, via the computer network, at least one traffic channel between the exchange and the computer, for sending speech signals, applying, in the exchange, a signal structure suitable for telephony over the computer network to speech signals intended for the computer in order to produce data packets containing telephony, and sending the data packets containing telephony to the computer over said traffic channel.

The object is also achieved by an exchange and a telephone system, where the exchange comprises a switch core, a switch control means responsible for setting up connections between users of the exchange and at least one first network connection device connected between the switch core and the computer network. The computer comprises a telephone function and has a computer network address. One network connection device in the exchange registers the computer as a telephone to which calls can be made in the switch control means and sets up, via the computer network, at least one traffic channel between the exchange and the computer for receiving speech signals. The network connection device receives data packets containing telephony from the computer over said traffic channel and removes a signal structure suitable for telephony over the computer network from the content of the data packets. The switch control means allocates a telephone number to the computer.

The object is furthermore achieved by a method comprising the steps of:

registering, in the exchange, the computer as a telephone to which calls can be made and allocating a telephone number to the computer, setting up, via the computer network, a traffic channel between the exchange and the computer, for receiving speech signals, receiving, in the exchange, data packets containing telephony from the computer over said signalling channel or over a traffic channel; and removing a signal structure suitable for telephony over the computer network from the content of the data packets.

A traffic channel or the signalling channel when used as a traffic channel are not channels in the ordinary sense. They preferably use UDP (unreliable datagram protocol). The channels then are connection-less type of connections. These channels do thus not have any relation to channels in time slots and channels of that type. The switch control means does however treat them as these ordinary traffic channels.

The invention has several advantages. By connecting the computer to the exchange as a telephone extension, the computer can use all of the resources available to a normal extension, such as conference connections, voice mail systems, call-back functions etc.

The invention has several advantages, where one is that companies having a private branch exchange can see to it that a computer can be used as a telephone for example at locations where there are no telephone sockets or to connect temporary workers having a computer but no telephone to the exchange.

One furthermore gains the advantage of using the monitoring functions present in the exchange in monitoring traffic to such an extension.

Another advantage is that the computer can use all of the resources available to a normal extension, such as conference connections, voice mail systems, call-back functions, possibility to connect calls via an operator and possibility of connecting to trunk lines.

The invention will now be described in more detail with reference to preferred embodiments and to the enclosed drawings.

DETAILED DESCRIPTION OF PREFERRED EMBODIMENTS

Figure 1:
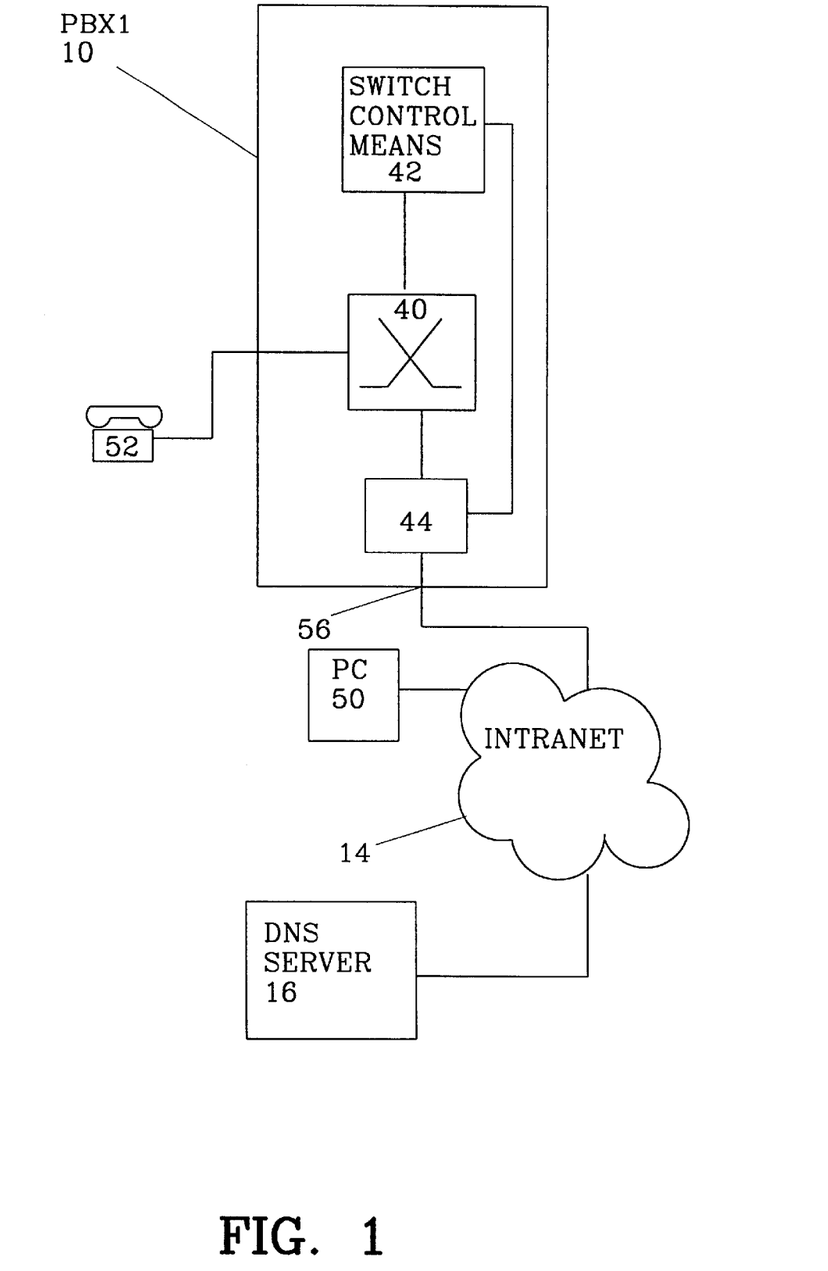
FIG. 1 shows a block schematic of a telephone system according to the invention comprising a telecommunication exchange connected to a computer via a computer network.

In FIG. 1 is shown a telephone system according to the invention comprising a telephone exchange PBX 10, for example in the form of private branch exchange, which is connected to a computer PC 50 by a computer network 14, which network is, in this embodiment, an intranet. A DNS (Domain Name System) server 16 is also connected to the intranet 14.

It shall be understood that the system could include more telephone exchanges, each connected to the intranet. The computer network is also not limited to an intranet but also internet is possible as well as various types of local networks or combinations of intranet and internet so that exchanges connected to the internet can get connected to the intranet of a company. The system is also not limited to private branch exchanges.

The exchange 10 PBX comprises a switch control means 42 connected to a switch core 40 and to a network connection device 44, where the network connection device 44 is connected between the switch core 40 and a gate 56 for connection to the computer network 14. The switch core 40 is connected to a first extension 52 (shown outside the exchange). The extension could also be replaced by a subscriber in a public switched telephone network (PSTN) who gets connected to a private branch exchange via said PSTN. What happens with the computer and the exchange is that the computer gets in contact with the exchange so that it can act as an extension of the exchange, to which normal telephone calls can be made. In order to do this a traffic channel is set up between the computer and the exchange via the intranet 14. This can be very advantageous in that companies that have a private branch exchange can see to it that a computer can be used as a telephone for example at locations where there are no telephone sockets or to connect temporary workers having a computer but no telephone to the exchange.

The exchange 10 can comprise several network connection devices 44, where each could be used for different computers or one handles several computers connected to it. The main part of the description and the figures will however only be limited to one network connection device for simplicity.

Figure 2:
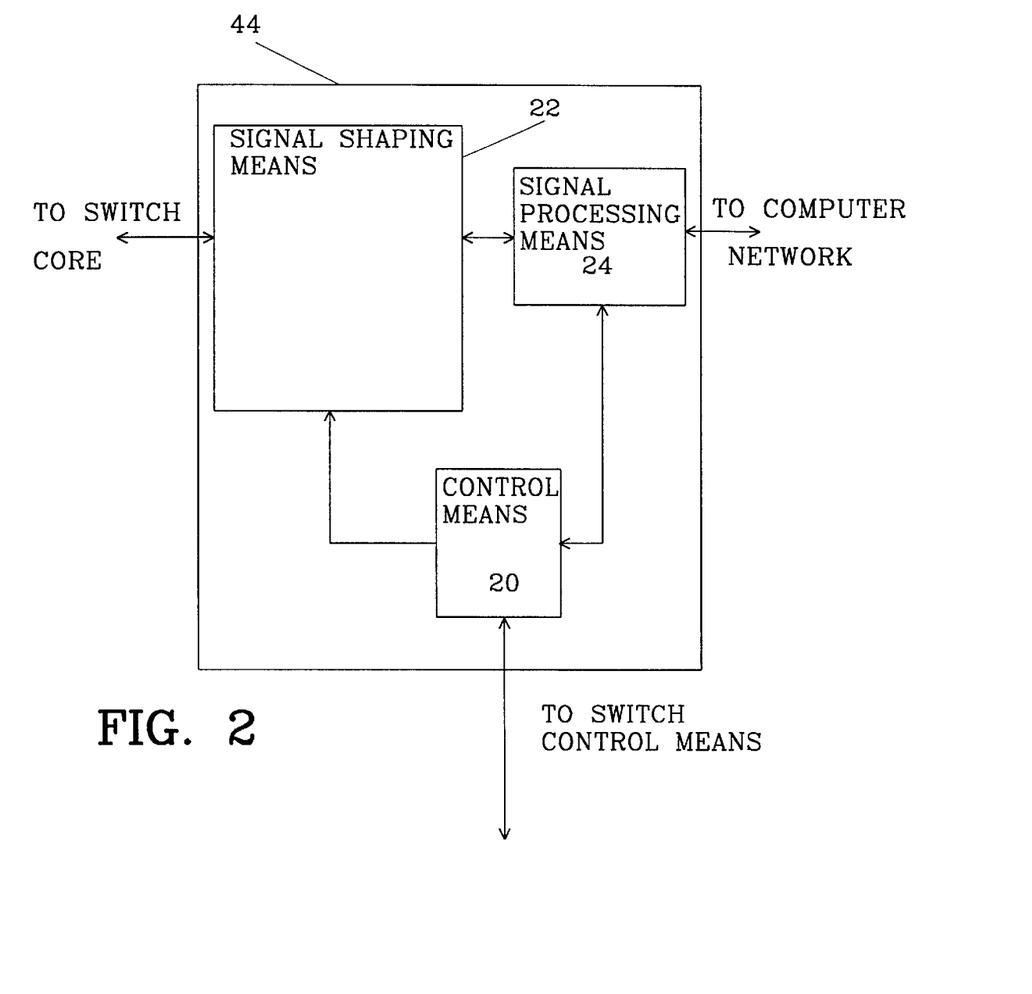
FIG. 2 shows a block schematic of a computer network connection device in an exchange.

In FIG. 2 is shown a network connection device 44 according to the invention. The network connection device 44 comprises a signal shaping means 22 connected to the switch core of the exchange, a signal processing means 24 connected between the signal shaping means and the gate and a local control means 20 connected to the switch control means as well as to the signal shaping means 22 and the signal processing means 24. The network connection device 44 is preferably realised in the form of a processor having various memories and registers connected to it.

Figure 3:
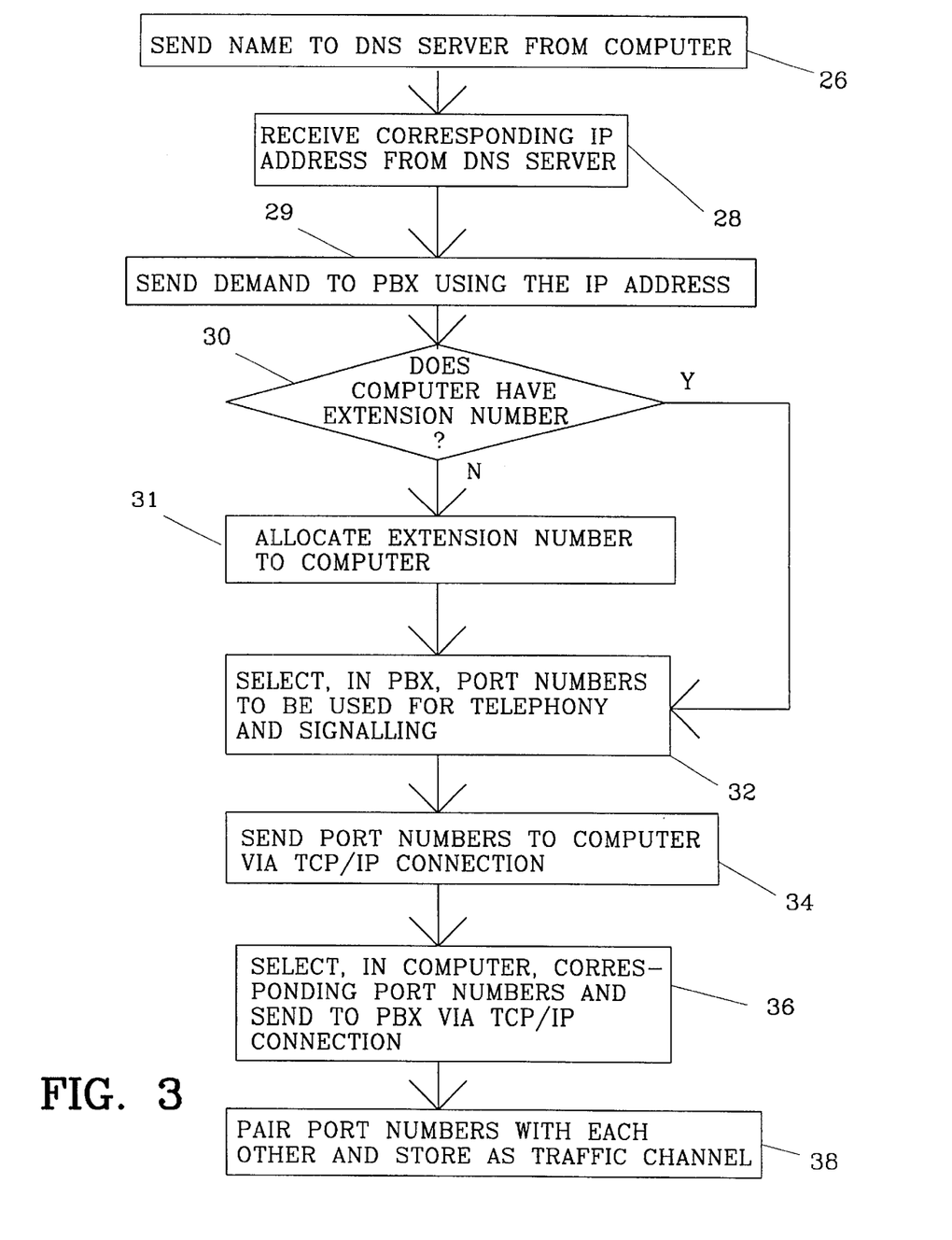
FIG. 3 shows a flow chart of a method for connecting the computer as an extension of the exchange.

FIG. 3 shows a method for initially connecting a computer to an exchange and registering it as an extension.

Figure 4:
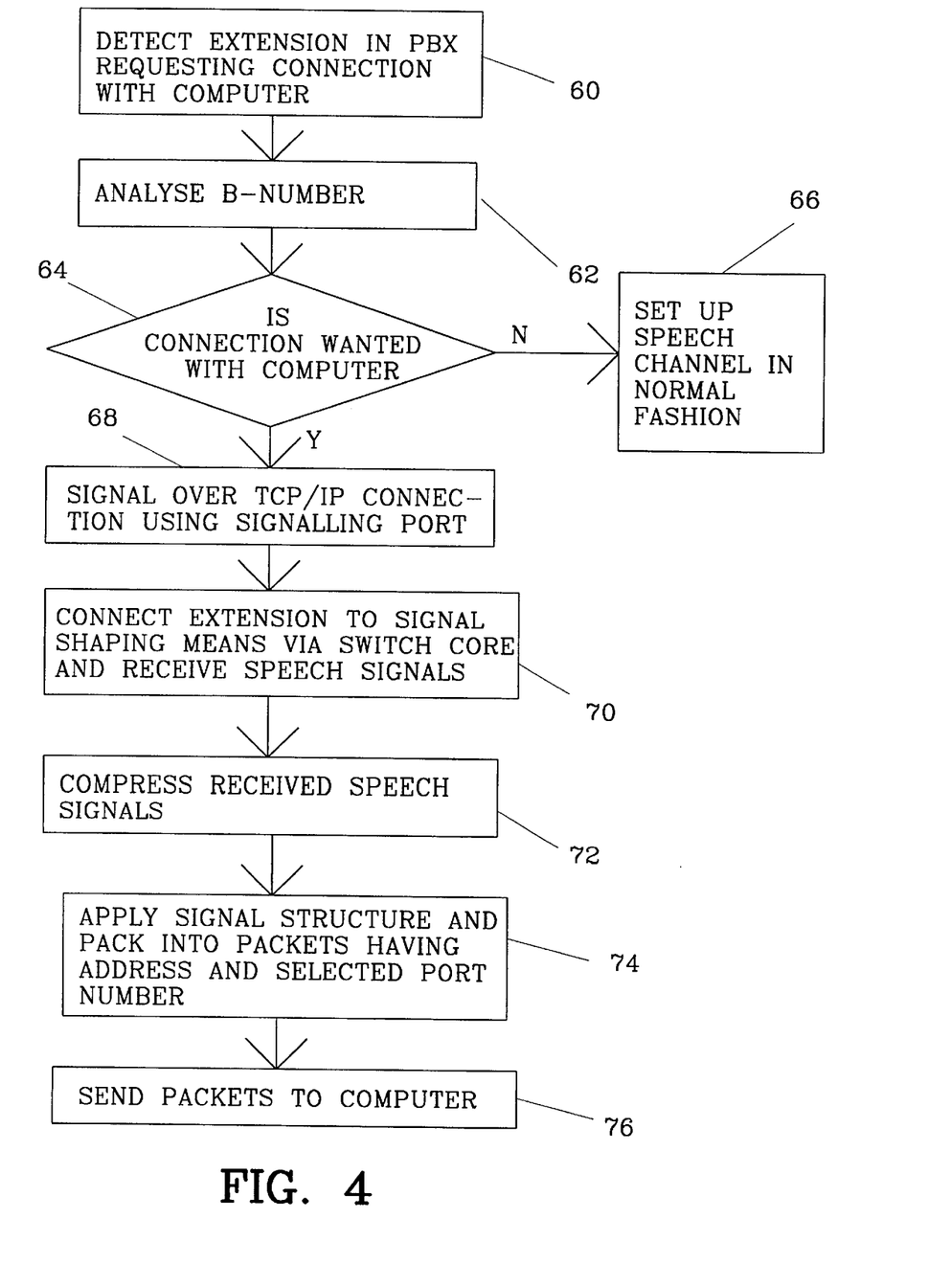
FIG. 4 shows a flow chart of a method used by the exchange for sending telephone signals to the computer over the computer network.
Figure 5:
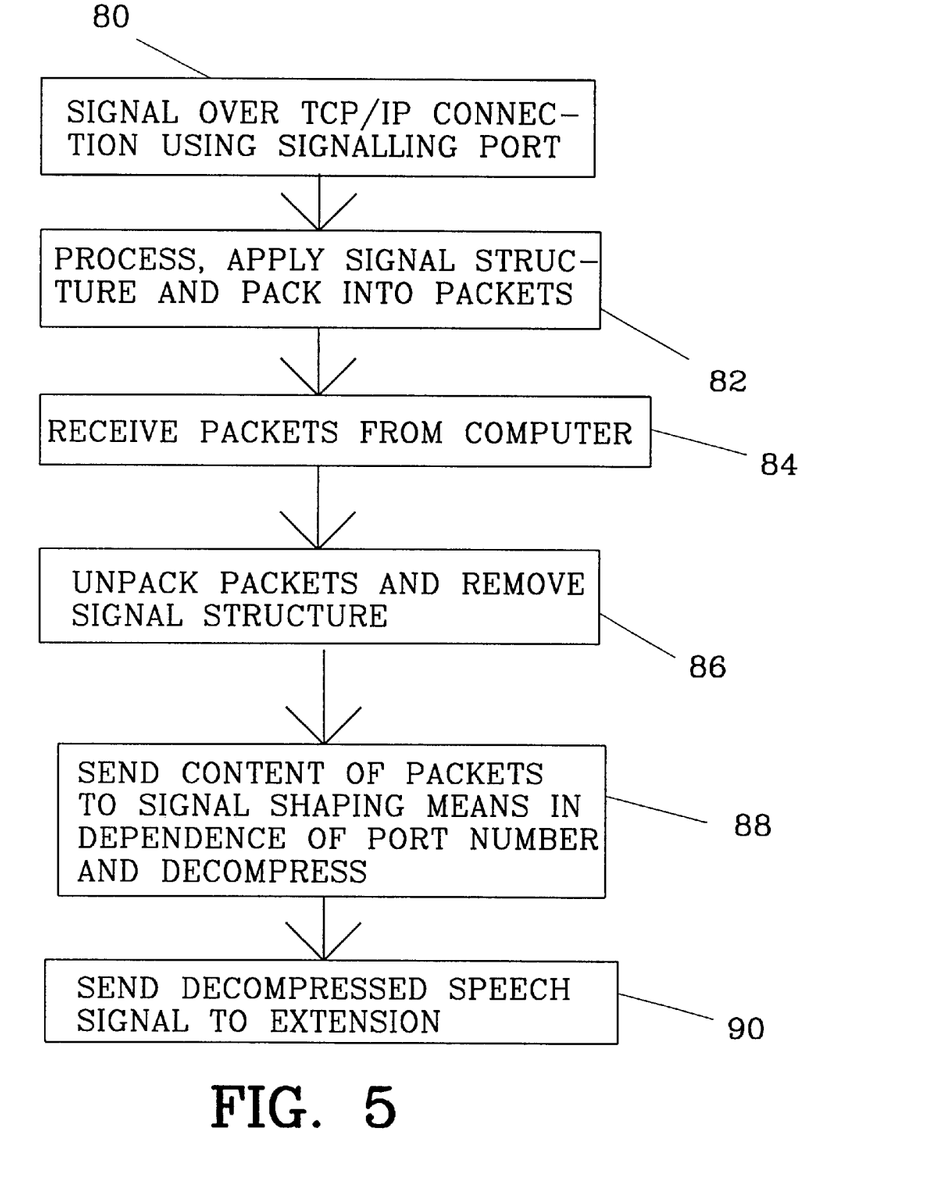
FIG. 5 shows a flow chart of a method used by the exchange for receiving telephone signals from the computer over the computer network.

FIG. 4 shows a flow chart of the method an exchange sending packets to the computer is working according to and FIG. 5 shows a flow chart of the method an exchange receiving packets is working according to.

The functioning of the system according to the invention will now be described with reference to FIGS. 1, 2, 3, 4 and 5.

The initial setting up of channels according to an embodiment of the invention will now be described with reference to FIG. 1, 2 and 3. Before starting up the system according to the invention for the first time, the local control means 20 of the network connection device 44 in the exchange PBX has an own computer network address and a first port number stored. The first port number is a calling port number and is to be used, together with the address, for demanding the set up of signalling and traffic channels from all computers in a system that can function as a telephone. This port number is universal in the sense that all computers have it and are to use this particular port number when sending data packets containing demands for a connection. The first port number can be hardware coded into the computer or pre-programmed. Port numbers is here the equivalent of TSAP identifiers that are described in the telecommunications standard ITU-T H.323, which document is herein incorporated by reference.

Each computer arranged to be used as a telephone does also have an own address and an own port number stored for use when demanding connections as well as an address of the DNS server 16.

What happens first when a computer is to be connected to or registered with an exchange is that, with reference to FIGS. 1, 2 and 3, a telephone function or application is started. This application can for example be started at start up of the computer, and a user of the computer can start using the application, i.e. to make a call, by clicking on an icon on his screen in order to start a telephone application for a computer, such as a software of the type Cooltalk or Webphone. The computer then sends at least one data packet, for example in the form of a TCP/IP packet (Transmission Control Protocol/Internet Protocol), to the DNS server 16 using the address of this DNS server, procedural step 26. The packet sent to the DNS server 16 contains the name or identity of the exchange to which the computer wants to connect itself. The DNS server 16 contains a table which translates each such name to a corresponding computer network address. The DNS server 16 then translates the name to a network address, which network address is associated with the network connection device 44, and returns the address to the computer, procedural step 28. The computer now has the address of the exchange and proceeds with sending a demand for connection using said address and the stored calling port number, procedural step 29. The demand here contains the own address of the computer and the own port number it wants to receive the reply on. The signal processing means 24 unpacks the packet, removes the signal structure and sends the content to the local control means 20. The local control means stores the received port number and address of the computer for use in replying to the demand. If the computer does not already have an extension number associated with it, procedural step 30, it has to get one allocated to it, procedural step 31.

As an alternative to the computer sending the port number it wants an answer on, this port number can be predetermined and the network connection device being provided with this port number in advance.

The allocation of extension numbers can be performed in different ways. The computer may have an extension number that it reports to the exchange. The signal processing means 24 receives this number in a packet, removes the signal structure TCP/IP from the packet and sends it to the local control means 20, which control means associates itself with said extension number. The local control means then informs the switch control means 42 that it will handle all communication with the extension number and the switch control means stores this information so that it can direct calls intended for the extension number to the network connection device via the switch core. An extension number can also alternatively be selected by the switch control means and given to the computer. Both the network connection device and the switch control means do not actually use the extension number, but the extension number is stored in a table and associated with another number, an individual number. It is this individual number that is stored in the network connection device and associated with the address of the computer.

When the extension number has been allocated or if a number has already been allocated previously, the local control means 20 selects information about a second port number, which it wants to use as a signalling channel and a third port number which it wants to use for a traffic channel, procedural step 32, and forwards this information to the signal processing means 24. The signal processing means sends this information in data packets having the same address and port number of the computer as before and applying the same signal structure, procedural step 34. The computer receives these second and third port numbers and selects own port numbers to be associated with these received second and third port numbers, and sends the selected port numbers to the network connection device 44, procedural step 36. The local control means 20, which has received these port numbers in the same way as previously described, as well as the computer, then pair the first and second port number with the port numbers selected by the computer so that a signalling port number pair and a traffic port number pair is obtained, procedural step 38. The signalling port number selected by the computer can be the same as the number previously used for demanding connection or a different one.

The setting up of signalling and traffic channels has here been described as being set up when the telephone application is started in the computer. As an alternative they can be set up only when a call is actually being made. The set up procedure could also include some authorisation procedure, wherein the exchange, when a demand is received, queries the computer about its status in the system. It then asks the computer for a code word or performs some other security check in order to find out if the computer is allowed to be connected to the exchange. This might be interesting if the exchange is a private branch exchange and access to the exchange is only wanted for certain computers, for example the computers of the company or in order to avoid persons stealing the extension numbers of other persons. In yet another alternative the channels can be set up from the start, i.e. the computer network device and the computer both have the appropriate address and port number stored in advance.

Another feature that might be interesting to include is that several network connection devices can be connected to the exchange and the one device which the computer first gets in contact with gives the computer the address of another network connection device. In this way the computer then gets connected to the other network connection device, which might be advantageous if one wants to spread out the work the network connection devices have to do between them, or to connect the computer to a network connection device that is physically closer to the computer than the first contacted network connection device. This is advantageous since it is a well known fact that in order to enhance the quality of a telephone call over a computer network it is better if the actual distance packets travel across the network is short. One could also envisage a scenario where the first network connection device gives the address of another network connection device in another exchange that is included in a corporate network. This might be advantageous for the same reasons as above. A further advantage might be obtained in that local telephone billings might be achieved by connecting to an exchange located in another city than the contacted exchange when a call is to be placed to the first mentioned city.

What happens when a telephone call is to be set up is thereafter first, with reference to FIGS. 1, 2 and 4, that a user of the ° exchange PBX at the first extension 52, wants to call a second extension 54, i.e. the computer. He therefore lifts the phone and dials the number of the second extension. This is detected by the switch control means 42 in the exchange PBX, procedural step 60. The switch control means then analyses the dialled number, the so called B-number, procedural step 62. If the number was a number not associated with the computer, procedural step 64, the switch control means 42 sets up a speech channel in a normal fashion, procedural step 66, like for example via the PSTN. In our case the number was however the number associated with the computer, procedural step 64. The number analysis is performed by the switch control means looking into above mentioned table and getting a number associated with the network connection device and the identity number associated with the computer. The switch control means therefore communicates with the local control means 20 of the indicated network connection device and informs it that a call is to be set up with said identity number.

Signalling information is thereafter sent from the switch control means 42 to the local control means 20 in the exchange 10. This signalling information is for example sent according to the protocol ECMA/ISO QSIG together with some other protocol, for example a protocol according to the standard H.323 or with some other suitable protocol. The local control means 20 sets the signal processing means 24 to apply a signal structure suitable for data communication, for example TCP, and supplies the signal processing means 24 with the previously mentioned IP-address and predetermined signalling port number to be used for communication with the computer. The signal processing means packs this signalling information in packets having above mentioned IP-address and port number and sends it to the computer via the computer network. During the signalling the network connection device in the exchange also receives packets from the computer, which packets have the own IP-address and the second port number. When the signal processing means 24 receives signalling packets from the computer it unpacks them, removes the signal structure and sends the content to the local control means 20. The local control means forwards all received signalling information to the switch control means, so that the switch control means can perform the ordinary signalling functions. During this signalling the connection is established in normal fashion using above mentioned signalling scheme, procedural step 68.

Thereafter, when all signalling has been performed and the speech signals are to be sent between the extensions on the traffic channel, the first extension 52 is connected to the selected signal shaping means 22 via the switch core 40, procedural step 70. This is achieved by the switch control means being informed by the local control means of a connection to which the speech signals to be sent, can be connected. The connection is a connection between the switch core and one signal shaping means that does not presently receive any other speech signals. The local control means then connects the selected signal shaping means 22 with the signal processing means 24 and sets the signal processing means to apply a signal structure suitable for telephony over the computer network UDP/IP (Unreliable Datagram Protocol/Internet Protocol) and to use the IP address of the computer and the selected port number for the traffic channel. The switch control means meanwhile connects the first extension with the signal shaping means via the switch core, procedural step 70. The signal shaping means then starts to receive speech signals from the extension 52. The received signals are compressed in the signal shaping means, procedural step 72, which compressed signals are then forwarded to the signal processing means 24. The compression can for example be performed using the LD-CELP compression algorithm according to the ITU-T standard G.728. The signal processing means 24 then applies the signal structure suitable for telephony over the computer network UDP/IP and packs these signals having this structure into packets having the IP address of the computer and the selected port number of the traffic pair, procedural step 74. These packets are thereafter sent to the computer via the computer network, procedural step 76.

The method the exchange PBX is working to when receiving traffic will in the following be explained with reference to FIGS. 1, 2 and 5.

Signalling is first performed between the exchange and the computer, procedural step 80. The signalling performed is the same as has been previously described in connection with sending of packets from the exchange to the computer and will thus not be further described here. When the signalling has been performed between the switch control means and the computer, which has a similar software as the network connection device for telephony over the computer network. i.e. Cooltalk, Webphone or some software based on standard H.323 etc, the computer processes speech signals to be sent from the computer to the exchange PBX, applies a signal structure like UDP/IP and packs them into data packets having the IP address of the network connection device and the selected port number, the third port number, procedural step 82. When doing this processing the computer converts analog electrical signals received from the microphone into digital signals that are compressed and upon which the signal structure is thereafter applied. The computer then sends these data packets to the computer network. The network connection device in the exchange PBX receives these packets, procedural step 84. The signal processing means then unpacks these packets and removes the signal structure, procedural step 86. The content of the packets are then forwarded to the selected signal shaping means 22. The signal shaping means 22 decompresses the content of the packets in order to obtain telephone signals having a structure suitable for switching in the switch core, procedural step 88. The structure suitable for switching is normally in the form of eight bits. The decompression changes the bit rate with which the signals are sent and can be performed according to a suitable decompression algorithm like LD-CELP according to the ITU-T standard G.728. The decompressed speech signals are then connected through the switch core to the second extension 54 and thus a speech connection is set up, procedural step 90.

When the conversation is finished, the call is terminated in conventional fashion. Special information typical for a corporate network, such as the name of the person calling and other so called D-channel information that can be transferred together with a call, can be transferred in the signalling channel. As an alternative a separate D-channel can be set up using a special D-channel port number for each voice connection.

In the previous description a separate signalling channel and a separate traffic channel were set up. The invention can however be modified in that the traffic channel is used for both signalling and traffic signals so that signalling is performed on the traffic channel prior to sending speech signals. A traffic channel is furthermore not a traffic channel in an ordinary sense, but a connection of the connection-less type using UDP/IP.

The network connection device can of course, and usually does, contain several signal shaping means and can usually set up connections to more computer than there are connections to the switch core. This is performed using above mentioned identity numbers.

During all the previously described activities the switch control means in the exchange is monitoring the functioning of the network connection device. This monitoring is performed by controlling the network addresses and port numbers used. These addresses and port numbers are updated when for examples changes of a corporate network is done. The addresses in the network can be changed, by the DNS server, when the network is changed like for example when it is expanded. The only part of the network that gets updated when reallocating addresses is the DNS server, so a check of addresses has to be performed from time to time. It is very convenient to incorporate these monitoring possibilities into the normal monitoring functions of the switch control means. Other monitoring functions incorporated into the switch control means are logging of problems on the computer network that disrupts the telecommunication traffic such as not receiving packets and generation of alarms if these problems reach a certain level. Examples of this are if a number of packets not received during a period of time are equal to a certain amount of packets, the number of distorted packets are higher than a certain level etc. Other functions are keeping of statistics of the quality like lost packets, failed connections etc. The software in the local control means can be updated at the same time as when other software in the exchange is updated.

With the invention one obtains a telephone system that makes it possible to connect a computer to an exchange as an extension so that a more flexible telephone system is achieved. One furthermore gains the additional advantage of using the monitoring functions present in the exchange in monitoring traffic to such an extension.

The present invention has been described in relation to voice compression. This is a preferred feature of the invention but it can optionally be left out of the exchange. The quality of the connections set up will then however be inferior. It can however be an alternative when a small local area network is used.

The invention has several advantages. By connecting the computer to the exchange as a telephone extension, the computer can use all of the resources available to a normal extension, such as conference connections, voice mail systems, call-back functions, possibility to connect calls via an operator and possibility of connecting to trunk lines.

The invention is of course not limited to the embodiments described above and shown in the drawings but can be modified within the scope of the enclosed claims.

What is claimed is:

1. Method for using a computer as a telephone comprising the steps of:

connecting the computer to a telephone exchange via a computer network, such that the computer is capable of receiving telephone calls over a direct telephone connection between the computer and a calling party;

registering, in the exchange, the computer as a telephone;

allocating, by the exchange, a unique telephone number that is to be associated with the computer;

setting up, via the computer network, a traffic channel between the telephone exchange and the computer, for sending and receiving speech signals;

generating data packets containing telephony by applying, in the exchange, a signal structure, suitable for telephony, to speech signals intended for the computer; and sending the data packets containing telephony to the computer over said traffic channel wherein telephony comprises speech signals transmitted between a user of the computer and the calling party in real time.

2. Method according to claim 1, further comprising the step of:

using the traffic channel for signaling before sending the data packets containing telephony.

3. Method according to claim 1, further comprising the step of:

setting up, via the computer network, a signaling channel between the exchange and the computer.

4. Method according to claim 3, wherein the step of setting up the traffic channel and the step of setting up the signaling channel comprise the step of:

receiving a demand from the computer to set up the traffic and signaling channels upon activation of a telephone function in the computer.

5. Method according to claim 3, wherein the step of registering the computer as a telephone comprises the steps of:

sending an identity from the computer to a DNS server; and receiving, in the computer, a computer network address for the exchange, wherein the computer network address for the exchange has been produced by the DNS server based on said identity, and wherein the address is used for setting up the signaling channel and the traffic channel between the exchange and the computer.

6. Method according to claim 1, wherein the step of setting up the traffic channel comprises the step of:

using a predetermined port number stored in the computer and the exchange.

7. Method according to claim 3, wherein the step of setting up the signaling channel and the step of setting up the traffic channel comprise the step of:

exchanging port numbers, wherein the exchange has selected a port number for the signaling channel and the traffic channel to be used by the computer when sending data packets to the exchanges and the computer has selected corresponding port numbers to be used by the exchange when sending data packets to the computer.

8. Method according to claim 4, further comprising the steps of:

receiving, in a network connection device of the exchange having a first computer network addresses, said demand from the computer;

querying the computer about its identity; and sending, based on the query, a second computer network address associated with a second network connection device in the exchange to the computer, so that the computer can connect to the second network connection device.

9. Method according to claim 1, wherein the step of generating data packets containing telephony by applying a signal structure is preceded by the step of compressing the speech signals.

10. Method for using a computer as a telephone comprising the steps of:

connecting the computer to a telephone exchange via a computer network, wherein the computer is an extension of the telephone exchange, such that said computer is capable of being used to originate a telephone call over a direct telephone connection between the computer and a called party;

registering, in the exchange, the computer as a telephone;

allocating, by the exchange, a telephone number to the computer;

setting up, via the computer network, a traffic channel between the exchange and the computer, for receiving speech signals;

receiving, in the exchange, data packets containing telephony from the computer over said traffic channel; and removing a signal structure suitable for telephony from the contents of the data packets wherein telephony comprises speech signals transmitted between a user of the computer and the called party in real time.

11. Telephone exchange comprising:

a switch core;

means for setting up a direct telephone connection, via a computer network, between an originating terminal and a receiving terminal, wherein one or both terminals is a computer, and wherein the computer and the computer network are configured as an extension of the telephone exchange, and switch control means for allocating a telephone number to the computer, and for setting up a connection between a user of the exchange and a first network connection device connected between the switch core and a gate of the exchange for communication with the computer, wherein the computer comprises a telephone function and has a computer network address, and wherein the first network connection device comprises:

means for registering, in the switch control means, the computer as a telephone to which calls can be made;

means for setting up, via the computer network, a traffic channel between the exchange and said computer, for sending speech signals;

signal processing means for generating data packets containing telephony, by applying a signal structure, suitable for telephony, to speech signals received from the switch core intended for the computer; and means for sending the data packets containing telephony to the computer over the traffic channel wherein telephony comprises speech signals transmitted between the originating terminal and the receiving terminal in real time.

12. Telephone exchange according to claim 11, wherein said network connection device further comprises:

means for setting up, via the computer network, a signaling channel between the exchange and the computer.

13. Telephone exchange according to claim 11, wherein said network connection device further comprises:

means for using the traffic channel for signaling prior to sending speech signals.

14. Telephone exchange according to claim 11, wherein the network connection device further comprises:

means for setting up a signaling channel between the exchange and the computer; and means for receiving a demand from the computer upon activation of the telephone function in the computer.

15. Telephone exchange according to claim 12, wherein the network connection device further comprises:

means for sending an identity of the computer to a DNS server;

means for receiving a computer network address for the computers and means for using the computer network address for setting up the traffic channel and the signaling channel between the exchange and the computer, said network address being produced by the DNS server based on the computer identity.

16. Telephone exchange according to claim 11, wherein the network connection device further comprises:

means for using predetermined, stored port numbers when setting up a channel.

17. Telephone exchange according to claim 13, further comprising a second network connection device, wherein the first network connection device has a first computer network addresses of the exchange, and wherein the first network connection device further comprises:

means for receiving the demand from the computer;

means for querying the computer about its identity; and means for sending, based on the query, a second computer network address associated with the second network connection device to the computer, so the computer can connect to the second network connection device.

18. Telephone exchange according to claim 11, wherein the network connection device further comprises:

means for compressing the speech signals before applying the signal structure.

19. Telephone exchange comprising:

a switch core;

means for setting up a direct telephone connection, via a computer network, between a computer and another party, wherein the computer is an extension of the exchange, and wherein the computer is capable of originating and receiving direct telephone calls as a telephone; and switch control means for allocating a telephone number to the computer; and means for setting up a connection between a user of the exchange and a network connection device connected between the switch core and a gate of the exchange for communicating with the computer, wherein the computer comprises a telephone function and a computer network address; and wherein the network connection device comprises:

means for registering, in the switch control means, the computer, as a telephone to and from which calls can be made;

means for setting up via the computer network, a traffic channel between the exchange and the computer, for receiving speech signals;

means for receiving data packets containing telephony from the computer over said traffic channel; and signal processing means for removing a signal structure, suitable for telephony over the computer network, from the contents of the data packets to produce speech signals containing telephony wherein telephony comprises speech signals transmitted between said computer and said another party in real time.

20. Telephone system comprising:

a computer;

a computer network;

a telephone exchange; and means for setting up a telephone connection between the computer and the telephone exchange via the computer network, wherein the computer is an extension of the exchange and has associated with it a computer network address, and wherein the computer is capable of directly receiving a telephone call from another party, the exchange comprising:

a switch core, switch control means for allocating a telephone number to the computer, and means for setting up a connection between a user of the exchange and a network connection device connected between the switch core and the computer network, the network connection device comprising:

means for registering, in the switch control means, the computer as a telephone to which direct telephone calls can be made;

means for setting up, via the computer network, a traffic channel between the exchange and said computer, for sending speech signals;

signal processing means for applying a signal structure, suitable for telephony over the computer network, to speech signals received from the switch core intended for the computer in order to produce data packets containing telephony; and means for sending the data packets containing telephony to the computer over the traffic channel wherein telephony comprises speech signals transmitted between said computer and said another party.

21. Telephone system comprising:

a computer, a computer network, a telephone exchange, and means for setting up a telephone connection between the computer and the telephone exchange via the computer network, wherein the computer is an extension of the exchange and the computer network interconnects the telephone exchange and the computer, and wherein the computer has a computer network address, and wherein the computer is configured such that it can be utilized to originate a direct telephone call connection with another party, the exchange comprising:

a switch core, switch control means for allocating a telephone number to the computer, and means for setting up a connection between a user of the exchange and a network connection device connected between the switch core and the computer network, the network connection device comprising:

means for registering, in the switch control means, the computer as a telephone from which direct telephone calls can be made;

means for setting up, via the computer network, a traffic channel between the exchange and the computer, for receiving speech signals;

means for receiving data packets containing telephony from the computer over said traffic channel; and signal processing means for removing a signal structure, suitable for telephony over the computer network, from the contents of the data packets wherein telephony comprises speech signals transmitted between said computer and said another party in real time.

* * * * *